(12) United States Patent
Yamaoka et al.

(10) Patent No.: US 8,813,862 B2
(45) Date of Patent: Aug. 26, 2014

(54) ELECTRIC WEEDER

(71) Applicant: Chervon (HK) Limited, Wanchai (HK)

(72) Inventors: Toshinari Yamaoka, Nanjing (CN); Zhen Wang, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 0 days.

(21) Appl. No.: 13/729,364

(22) Filed: Dec. 28, 2012

(65) Prior Publication Data

US 2013/0168115 A1  Jul. 4, 2013

(30) Foreign Application Priority Data

Dec. 30, 2011  (CN) .......................... 2011 1 0452621

(51) Int. Cl.
*A01B 33/06* (2006.01)
(52) U.S. Cl.
USPC .................. 172/25; 172/41; 172/378; 294/50
(58) Field of Classification Search
USPC ........ 172/25, 41, 371, 378, 110, 125; 294/50, 294/61
See application file for complete search history.

(56) References Cited

U.S. PATENT DOCUMENTS

| | | | | |
|---|---|---|---|---|
| 1,092,818 A | * | 4/1914 | Bittner, Jr. .................. | 294/50.5 |
| 1,134,618 A | * | 4/1915 | Kaufman ..................... | 294/50.7 |
| 2,500,647 A | * | 3/1950 | Schulthess ................... | 294/61 |
| 2,552,467 A | * | 5/1951 | Thomas ........................ | 294/61 |
| 2,593,283 A | * | 4/1952 | Erlebach, Sr. ................ | 294/50 |
| 2,695,188 A | * | 11/1954 | Nutt .............................. | 294/61 |
| 2,804,336 A | * | 8/1957 | Thompson .................... | 294/61 |
| 3,444,934 A | * | 5/1969 | Alberto ......................... | 172/25 |
| 3,596,966 A | * | 8/1971 | Shredl ........................... | 294/61 |
| 5,004,283 A | * | 4/1991 | Sullivan ........................ | 294/61 |
| 5,005,888 A | * | 4/1991 | Parks et al. .................... | 294/50 |
| 5,193,871 A | * | 3/1993 | Williams ....................... | 294/61 |
| 5,261,496 A | * | 11/1993 | Smotherman ................. | 172/25 |
| 5,330,010 A | * | 7/1994 | Smotherman ................. | 172/25 |
| 5,370,433 A | * | 12/1994 | Yost .............................. | 294/50.5 |
| 6,736,217 B2 | * | 5/2004 | Brown .......................... | 172/41 |
| 7,314,095 B2 | * | 1/2008 | Cobb ............................ | 172/25 |
| 7,845,696 B2 | * | 12/2010 | Hatcher et al. ............... | 294/50.5 |

* cited by examiner

*Primary Examiner* — Matthew D Troutman
(74) *Attorney, Agent, or Firm* — Greenberg Traurig, LLP

(57) ABSTRACT

An electric weeder, including a housing, a driving device, a working head, and a removable handle. The driving device is disposed in a housing, and including an axis line. The working head is connected to the axis line and driven by the driving device; the removable handle moves relative to the working head and the housing, and wherein on end of the removing handle is movably connected to the housing, the other end includes a removing plate, and the removing plate includes a through portion being passed through by the working head. The electric weeder of the present invention can exactly weed the lawn with little damage, the overall structure of the machine is more simple to effectively reduce the overall length of the machine; the removable handle can remove the weeds automatically to lower the work intensity and increase the weeding efficiency.

19 Claims, 5 Drawing Sheets

ELECTRIC WEEDER

CROSS REFERENCE TO RELATED APPLICATION

This application is a non-provisional application claiming priority from Chinese Patent Application No. CN201110452621.X, filed Dec. 30, 2011, and incorporated herein by reference in its entirety.

FIELD OF THE DISCLOSURE

The present invention relates to an electric tool for weeding the lawn in a garden, and more particularly to an electric weeder.

BACKGROUND OF RELATED ART

In the prior art, the traditional methods for weeding the lawn include manual weeding and spraying herbicide by a chemical method. In order to alleviate work intensity of manual weeding and enhance the efficiency of weeding, some digging tools are designed for weeding, which contain manual machine and hand-held electric weeder. However, these digging tools almost have some disadvantages, for example, the weeds cannot be eradicated, or some large pits may be remained in the ground after weeding, so that the initial greensward and then the lawn are damaged.

The prior electric weeder commonly includes a diving device, a transmission device, an operating handle, a connecting device, a removing device, and a working head. This weeder has a relatively long and incompact overall structure, and the removing structure is too complex for the user to operate conveniently; moreover, the handle structure of the machine is not designed according to the characteristic of the weeding operation, that is, it is not designed by cooperating the weeding operation with the ergonomics application, resulting in that the user may get tired easily when operating the machine and it is time and labor consuming.

SUMMARY

The object of the present invention is to provide an electric weeder which can exactly weed the lawn with little damage, and it includes a simple weeds-removing mechanism and can enhance the efficiency of weeds-removing. In addition, the present invention provides an operating method for weeding, and also provides an optimal size range of the external appearance which incorporates with the external shape of the machine, with such size range, the weeder enables the force direction of the hand of the operator approximately pass through the working head of the machine during the operation so as to obtain an object of labor saving.

In order to resolve the above technical problem, the present invention provides an electric weeder, including a driving device, a transmission shaft, a working head, a sleeve, a removable handle, and a removing plate. The driving device is disposed in the housing, a transmission shaft is rotatively driven by the driving device, the working head is connected to and rotated along with the transmission shaft. The sleeve is mounted around the transmission shaft and connected to the housing; the removable handle is configured to move along the transmission shaft, and one end of the removable handle is disposed around the sleeve; the removing plate is disposed on the other end of the removable handle and configured to move along with the removable handle, and the removing plate is provided with a through portion allowing the working head to pass through.

The invention also provides an electric weeder, including a housing, a driving device, a working head, and a removable handle. The driving device is disposed in a housing, and including an axis line. The working head is connected to the axis line and driven by the driving device; the removable handle moves relative to the working head and the housing, and wherein on end of the removing handle is movably connected to the housing, the other end includes a removing plate, and the removing plate includes a through portion being passed through by the working head.

The beneficial effects of the present invention are as follows:

The electric weeder of the present invention can exactly weed the lawn with little damage, and the weeds-removing mechanism is simple and practical. The removable handle is directly cooperated with the weeds-removing mechanism in the axial direction such that the weeds and soils can be pushed out by the removable handle without any connections that are usually arranged between the conventional operating handle and the weeds-removing mechanism, which makes the overall structure of the machine more simple and effectively reduces the overall length of the machine; the removable handle can remove the weeds automatically so as to lower the work intensity of the operator and increase the efficiency of weeding. Contrary to the conventional machine, the design for the external structure of the present invention advantageously cooperates with the ergonomics. As a result, the operator can operate the machine with labor and time saving, and it is not easy to feel tired upon holding the machine, thus the work efficiency can be enhanced greatly.

DETAILED DESCRIPTION

Next, the present invention will be described with reference to the drawings. The following embodiments are only used to explain the technical solutions of the present invention more clearly, and cannot be used to restrict the protection scope of the present invention.

The First Embodiment

Figure 1:
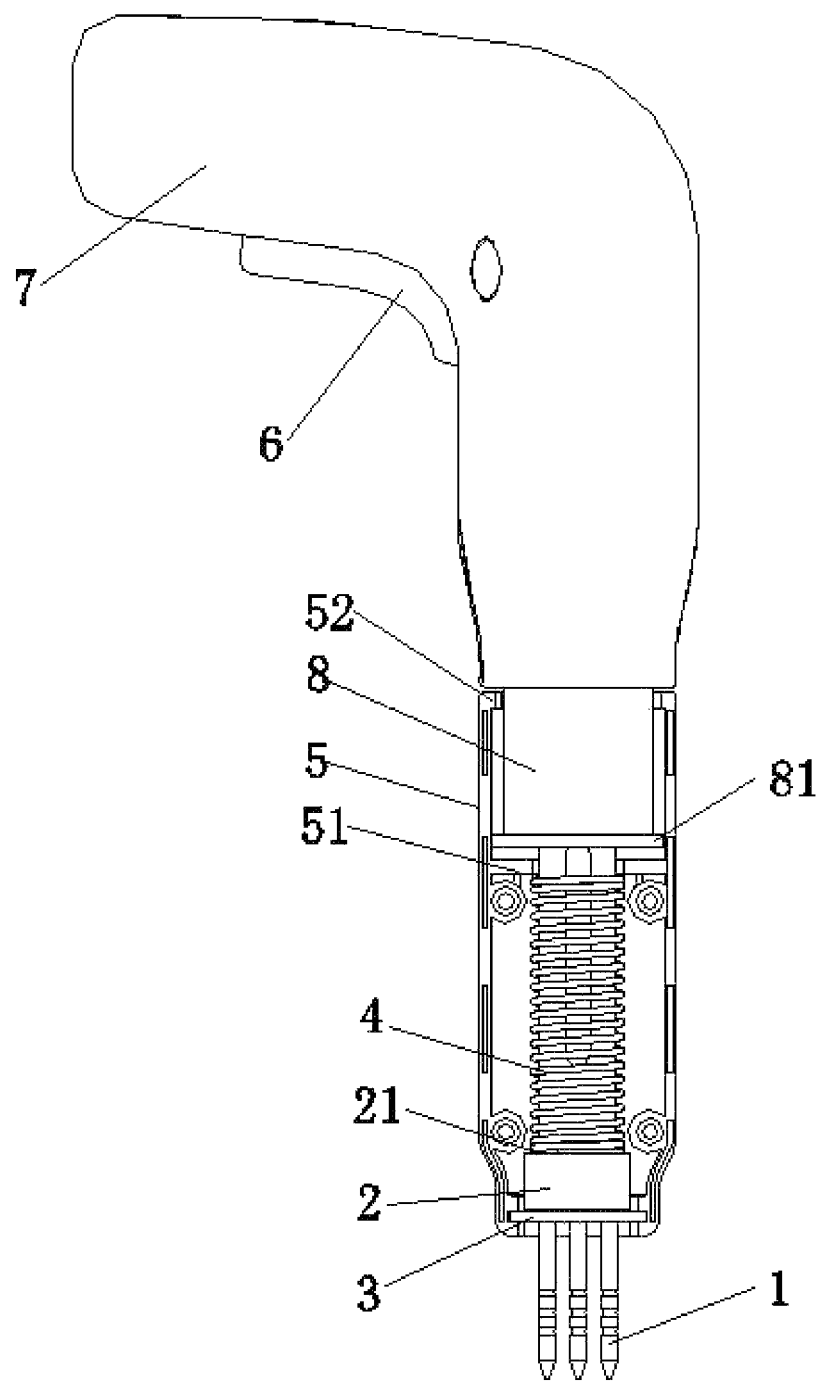
FIG. 1 is a structural view of an electric weeder according to one embodiment of the present invention.
Figure 2:
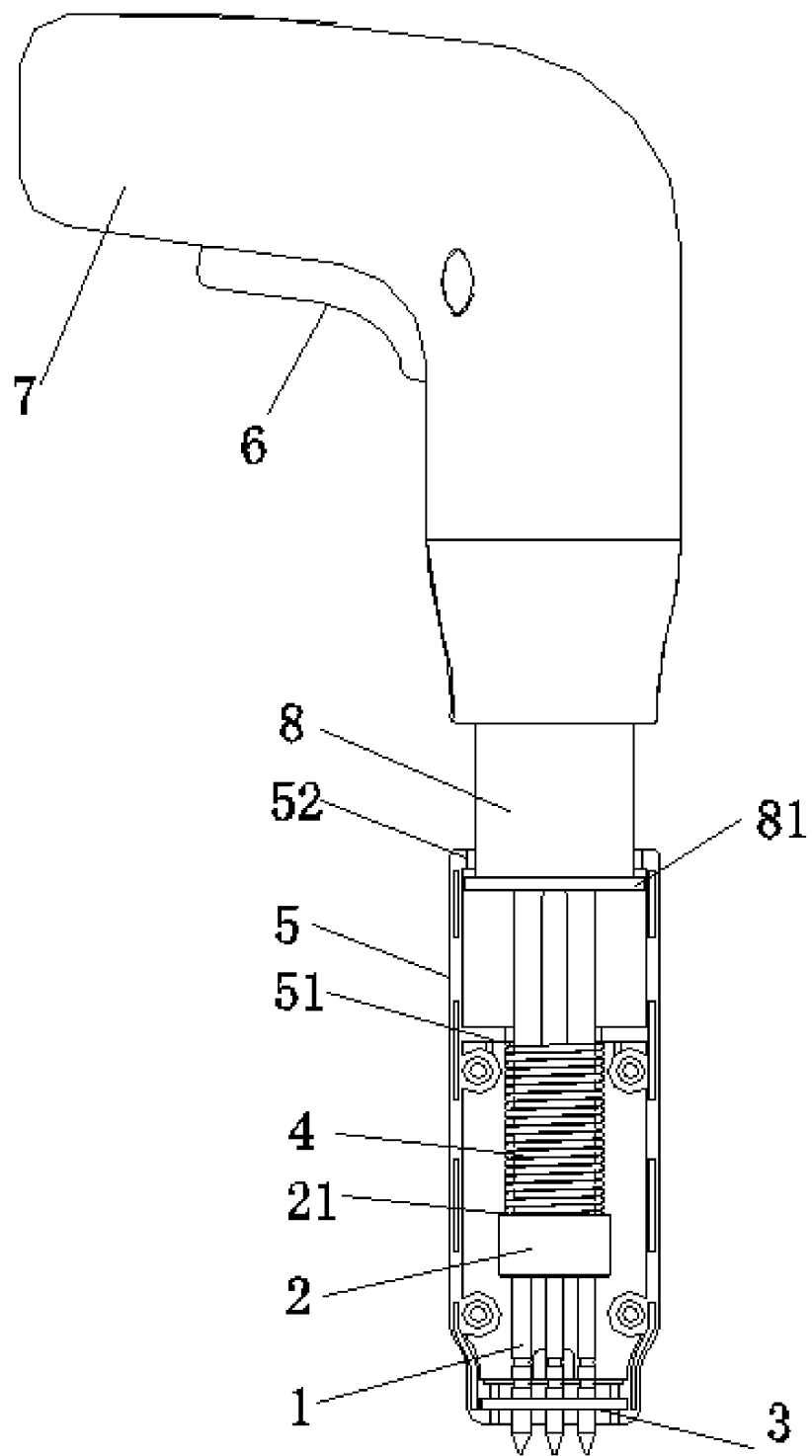
FIG. 2 is a structural view of the electric weeder of FIG. 1 during removing the weeds.

As shown in FIGS. 1 and 2, the electric weeder includes a power portion, a transmission portion, and a weeds-removing mechanism. A driving device (not shown) is disposed in a main housing 7 and used to drive a transmission shaft 2 to rotate. A sleeve 8 which is mounted around the transmission shaft 2 is connected to the lower end of the main housing 7, and in other embodiments, the sleeve 8 may be integrated with the main housing 7. One end of the sleeve 8 is connected to the main housing 7, and the other end is a flange 81 protruding from the body of the sleeve. Generally, the working head of the machine includes several rods 1 arranged on the same circumference, wherein the ends of the rods are all connected to the transmission shaft 2. The driving device may be similar to that of an electric drilling machine, an electric screwdriver, or other electric driving devices.

A removable handle 5 is disposed around the periphery of the transmission shaft 2 and can slide along the transmission shaft 2. The removable handle 5 is configured as cylinder shape, wherein one end thereof is a hook 52 which is slidably mounted around the outer wall of the sleeve 8 and limited by the flange 81 on the lower end of the sleeve 8 so as to slide without disengaging from the outer wall of the sleeve 8, and the other end thereof is closed by a removing plate 3. The removing plate 3 is provided with several through portions for allowing several rods 1 to pass through, respectively. In addition, a circular limiting plate 51 is connected to the inner wall of the removable handle 5, and the distance between the limiting plate 51 and the hood 52 is larger than the height of the sleeve 8, so that the flange 81 on the sleeve 8 is always located between the limiting plate 51 and the hook 52. The circular structure formed in the limiting plate 51 will not interfere with the movement of the transmission shaft 2, and the transmission shaft 2 can freely rotate or shuttle axially therein.

The weeds-removing mechanism further includes a reset element which is generally a reset spring 4 mounted around the transmission shaft 2. The transmission shaft 2 is provided with a shoulder 21, thus, one end of the reset spring 4 may be abutted against a limiting plate 51 in the removable handle 5, and the other end of the reset spring 4 may be abutted against the shoulder 21 on the transmission shaft 2, so that the reset spring 4 is held by the limiting plate 51 and the shoulder 21.

When using the electric weeder to weed the lawn, as shown in FIG. 1, the center of the circumference surrounded by the rods 1 should be aligned with the roots of the weeds and the machine should be inserted into the ground with an appropriate depth. Subsequently, the switch 6 is activated to control the start of the driving device in the main housing 7, and then the transmission shaft 2 is driven by the driving device and rotated to bring the rods 1 to rotate, such that the roots of the weeds and the soil can be wrapped on the rods 1 under the action of the rotation of the rods 1. At this time, the operator may turn off the switch 6 and pull the rods 1 together with the weeds and soil out of the ground. In this way, only a very small pit may be remained on the ground which was occupied by the weeds.

When removing the weeds, the operator may push the removable handle 5 downwards, and the removable handle 5 may force the removing plate 3 to move downwards, as shown in FIG. 2. With the guidance of the through portions on the removing plate, the removing plate 3 may move downwards along the rods 1 to remove out the soil wrapped on the rods 1 and the weeds in the soil. Since the reset spring 4 abuts against the shoulder on the transmission shaft 2 at one end and keeps static relative to the transmission shaft 2, the limiting plate 51 in the removable handle 5 will compress the reset spring 4 when the removable handle 5 moves downwards in the axial direction of the sleeve 8. During the movement of the removable handle 5, the extreme position thereof is limited by locking the hook 52 at one end of the removable handle 5 on the flange 81 of the sleeve 8.

When the soil wrapped on the rods 1 and the weeds in the soil have been removed out by pushing the removable handle 5 downwards, if the operator releases the removable handle 5, the weeds-removing mechanism will restore to its initial position automatically under the action of the reset force of the reset spring 4.

The Second Embodiment

Figure 3:
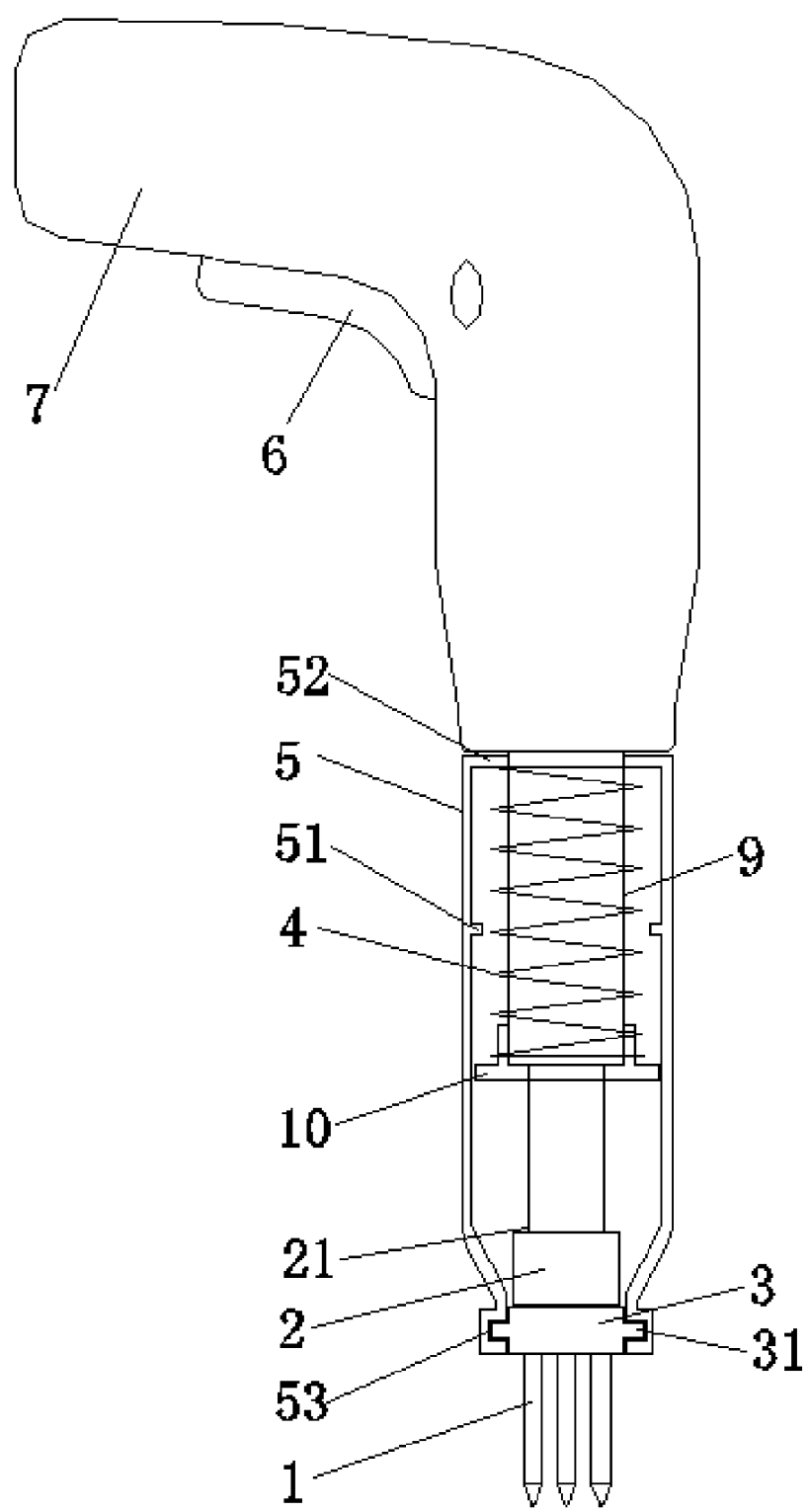
FIG. 3 is a structural view of an electric weeder according to another embodiment of the present invention.
Figure 4:
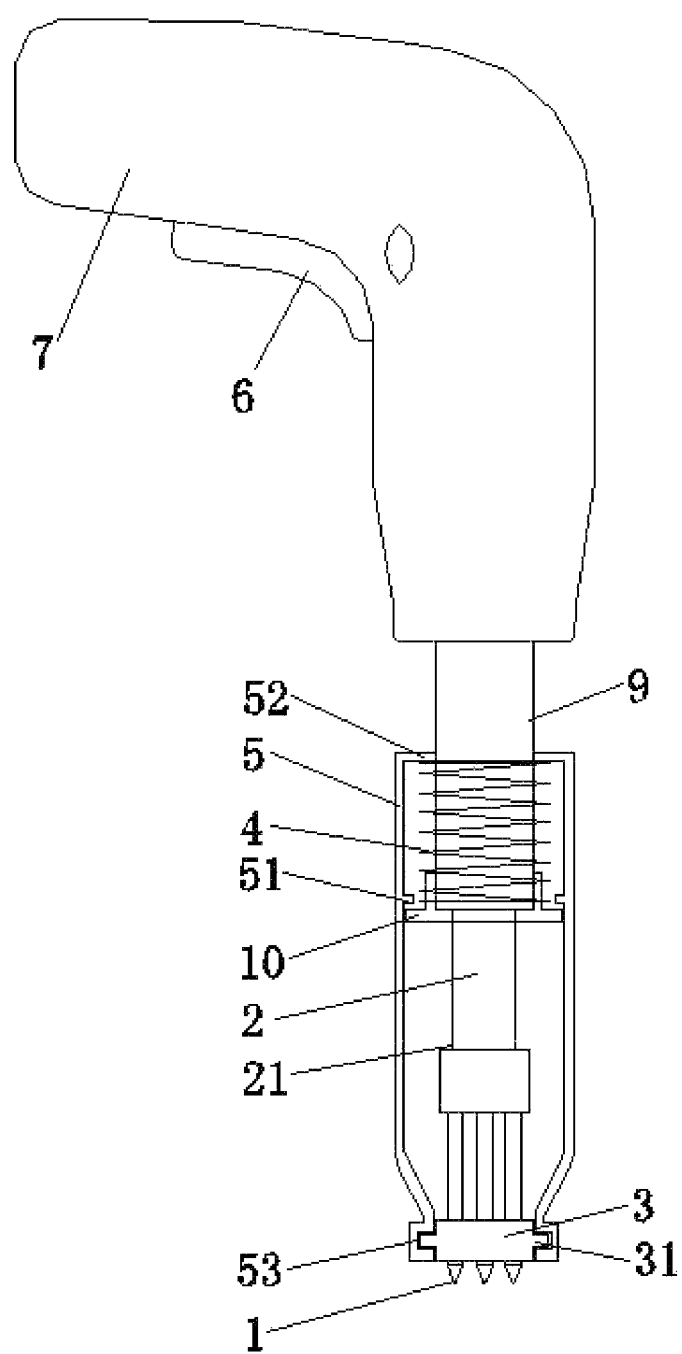
FIG. 4 is a structural view of the electric weeder of FIG. 3 during removing the weeds.

As shown in FIGS. 3 and 4, the present embodiment is improved on the basis of the first embodiment.

In the present embodiment, the removing plate 3 is moveably connected to the removable handle 5. The removing plate 3 is provided with a circle of protruding flange 31 at the outer periphery, and the end of the removable handle 5 is correspondingly provided with a circle of groove 53 for accommodating the protruding flange 31 of the removing plate 3, so that the removing plate 3 can be freely rotated in the removable handle 5. With such configuration, when the removable handle 5 is pushed to slide up and down in the axial direction, the removing plate 3 can also be forced to slide. Moreover, the structure of the sleeve 8 in the first embodiment is changed in the present embodiment. Specifically, a sleeve 9 which is mounted around the transmission shaft 2 is connected to the lower end of the main housing 7, and in other embodiments, the sleeve 9 may be integrated with the main housing 7. One end of the sleeve 9 is connected to the main housing 7, and the other end is connected with a protruding spring limiting block 10. In addition, a circular limiting plate 51 is connected to the inner wall of the removable handle 5, wherein the distance between the limiting plate 51 and the hook 52 is smaller than the height of the sleeve 9, and the spring limiting block 10 connected to the sleeve 9 can stop the downward movement of the limiting plate 51 so as to restrict the removable handle 5 to slide in a certain range.

The reset spring 4 is mounted around the sleeve 9 and the two ends of the reset spring 4 respectively abuts against the hook 52 of the removable handle 5 and the spring limiting block 10 so that it can be held by the hook 52 of the removable handle 5 and the spring limiting block 10.

Other structures are similar to those in the first embodiment.

When weeding the lawn, the driving device is turned on by the switch 6 to drive the transmission shaft 2 to be rotated, and the rods 1 can be rotated along with the transmission shaft 2 to force the removing plate 3 mounted around the rods 1 to be rotated. Since the removing plate 3 is movably connected with the removable handle 5, the removable handle 5 would not rotate when the removing plate 3 is rotated with the rods 1. Moreover, the reset spring 4 is mounted around the sleeve 9, so that the reset spring 4, the sleeve 9, and the spring limiting block 10 would not rotate with the transmission shaft 2 when the transmission shaft 2 is rotated. In this way, it can prevent the removable handle 5, the reset spring 4, the sleeve 9 and other elements rotating as the rotation of the transmission shaft 2, thereby reducing the output power of the driving device.

The Third Embodiment

In the first embodiment, as shown in FIGS. 1 and 2, during the normal state (i.e. the electric weeder is not operated); the removable handle 5 is located at a position near to the top portion under the action of the reset spring 4. Every time the machine is operated, it is necessary to overcome the elastic force of the reset spring to manually push the removable handle 5 downwards to a position near to the bottom portion so as to force the removing plate 3 to remove the weeds.

In the present embodiment, the position of the reset spring 4 in the first embodiment is changed, that is, the reset spring is mounted around the transmission shaft and held by the limiting plate 51 and the flange 81.

During the natural state (i.e. the electric weeder is not operated), the removable handle 5 is located at a position near to the bottom portion under the action of the reset spring, namely, a position shown in FIG. 2. When the operator uses the machine to remove the weeds, the center of the circumference surrounded by the rods 1 should be aligned with the roots of the weeds and the machine should be inserted into the ground with an appropriate depth, the removing plate 3 will be pushed to move upwards due to the resistance of the soil, and then the insertion force can overcome the elastic force of the reset spring. As a result, as shown in FIG. 1, the removable handle 5 is pushed to a position near to the top portion (in other embodiments, the removable handle can also be lifted upwards by hand firstly), and the reset spring is compressed. As such, if the operator activates the switch 6, the rods 1 will rotate along with the transmission shaft 2, so that the roots of the weeds and the soil can be wrapped on the rods 1 under the action of the rotation of the rods 1. At this time, the operator may pull the rods 1 together with the weeds and soil out of the ground, and the removable handle can be automatically restored to remove the weeds under the action of the reset force of the reset spring. That is to say, it is not necessary to manually push the removable handle 5 and can obtain the automatic weeds-removing.

The Fourth Embodiment

In the second embodiment, as shown in FIGS. 3 and 4, during the natural state (i.e. the electric weeder is not operated), the removable handle 5 is located at a position near to the top portion under the action of the reset spring 4. Every time the machine is operated, it is necessary to overcome the elastic force of the reset spring to manually push the removable handle 5 downwards to a position near to the bottom portion so as to force the removing plate 3 to remove the weeds.

In the present embodiment, the position of the reset spring 4 in the second embodiment is changed, that is, the reset spring 4 is mounted around the sleeve 9 which is located at the outside of the removable handle, and the reset spring 4 is held by the hook 52 of the removable handle 5 and the shoulder formed at the joint between the housing and the sleeve.

During the natural state (i.e. the electric weeder is not operated), the removable handle 5 is located at a position near to the bottom portion under the action of the reset spring, namely, a position shown in FIG. 4. When the operator uses the machine to remove the weeds, the center of the circumference surrounded by the rods 1 should be aligned with the roots of the weeds and the machine should be inserted into the ground with an appropriate depth, the removing plate 3 will be pushed to move upwards due to the resistance of the soil, and then the insertion force can overcome the elastic force of the reset spring. As a result, as shown in FIG. 3, the removable handle 5 is pushed to a position near to the top portion (in other embodiments, the removable handle can also be lifted upwards by hand firstly), and the reset spring is compressed. As such, if the operator activates the switch 6, the rods 1 will rotate along with the transmission shaft 2, so that the roots of the weeds and the soil can be wrapped on the rods 1 under the action of the rotation of the rods 1. At this time, the operator may pull the rods 1 together with the weeds and soil out of the ground, and the removable handle can be automatically restored to remove the weeds under the action of the reset force of the reset spring. That is to say, it is can obtain the automatic weeds-removing without manually pushing the removable handle 5.

The Fifth Embodiment

Figure 5:
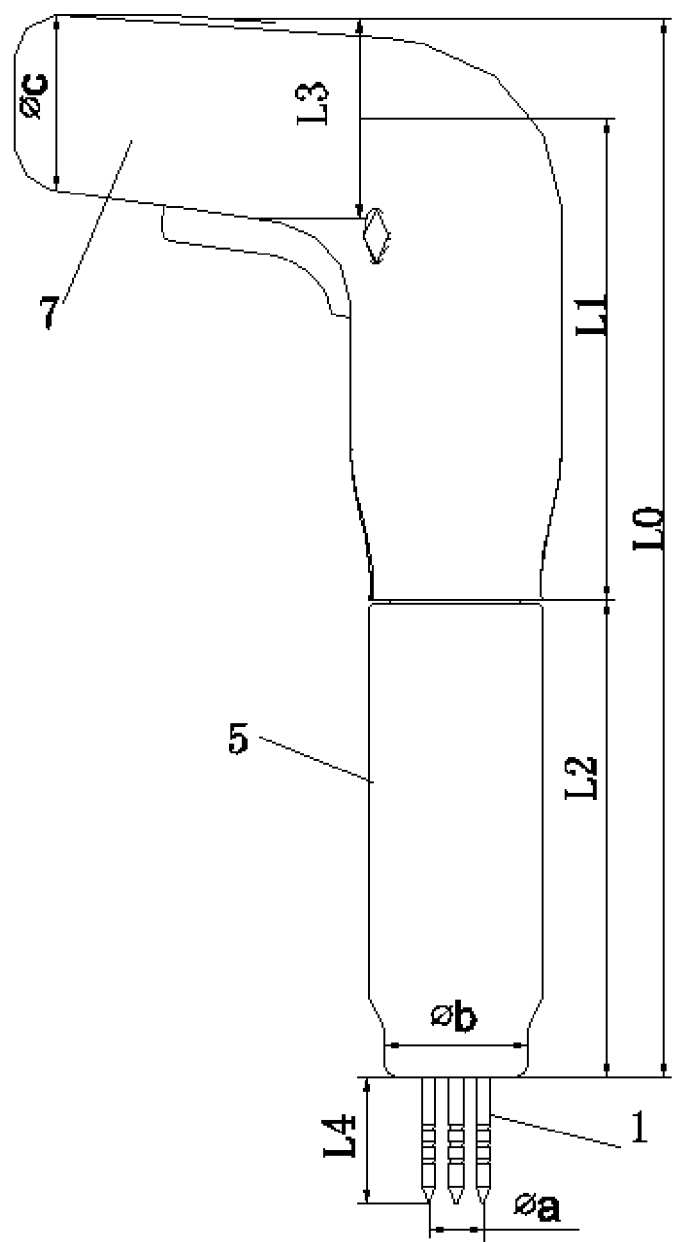
FIG. 5 is a structural view of the external structure of the electric weeder according to the present invention.

As shown in FIG. 5, the external dimensions of the electric weeder in the above embodiments are optimally designed.

The optimal lengths of the electric weeder are as follows:

1. The length $L_1$ of the hand-held portion of the main housing 7 of the electric weeder is $50 < L_1 \le 170$ mm, so that a space for receiving the fingers is provided when the operator holds the handle;

2. The length $L_2$ of the removable handle 5 is $60 < L_2 \le 200$ mm, so that a space for operating with fingers is provided when the operator holds the removable handle to remove the weeds;

3. The width $L_3$ for holding on the main housing 7 is $30 < L_3 \le 60$ mm, so that the main housing is adapted to be hand-held by the operator and a space for operating with fingers is provided;

4. The overall length of the machine is $L_0 = L_1 + L_2 + L_3/2 > 50 + 60 + 15 = 125$ mm, $L_0 = L_1 + L_2 + L_3/2 \le 170 + 200 + 30 = 400$ mm, and thus $125 < L_0 \le 400$ mm;

5. The effective working length of the pin is $20 < L_4 \le 50$ mm, and $L_4/L_0 = 0.05 \sim 0.4$.

The optimal diameter ratios of the electric weeder are as follows:

1. The diameter $\Phi a$ of the circumference along which the rods 1 are arranged is $\Phi 8$ mm$\le \Phi a \le \Phi 20$ mm. With this range, the pit remained on the ground after weeding has a suitable diameter, and the resistance during the rotation of the pin is also suitable since the larger the diameter is, the greater the resistance is.

2. The diameter $\Phi b$ of the end of the removable handle 5 is $\Phi 12 \le \Phi b \le \Phi 30$ mm. With this range, the operator can easily observe the roots of the weeds, and the end of the removable handle would not obstruct the vision of the operator.

3. The diameter $\Phi c$ of the hand-held portion of the handle is $\Phi 25 \le \Phi c \le \Phi 45$ mm. With this range, the handle is suitable to be held by hand.

4. In order to make the operator observe that the working head is exactly located at the roots of the weeds during the operation, the ratio of the working portion is $\Phi a / \Phi b = 0.5 \sim 1$.

The above contents are the preferred embodiments of the present invention. It should be noted that without departing the technical principle of the present invention, the person skilled in the art may make some modifications and changes to the present invention, which may be considered as a part of the protection scope of the present invention.

We claim:

1. An electric weeder, comprising a driving device disposed in a housing, a transmission shaft rotatively driven by the driving device, and a working head connected to and rotated along with the transmission shaft, wherein the electric weeder further comprises:
 a sleeve mounted around the transmission shaft and connected to the housing;
 a removable handle, a first end of the removable handle being disposed around the sleeve, and the removable handle being configured to slide along the transmission shaft on the sleeve; and
 a removing plate disposed on a second end of the removable handle and configured to move along with the removable handle as the removable handle slides along the transmission shaft on the sleeve, and the removing plate being provided with a through portion allowing the working head to pass through wherein the removing plate is configured to be rotated axially in an accommodating space formed at the second end of the removable handle without disengaging from the second end of the removable handle as the removable handle remains axially fixed.

2. The electric weeder of claim 1, wherein the sleeve further comprises a limiting structure to limit the slide of the removable handle.

3. The electric weeder of claim 2, wherein the electric weeder further comprises a circle of limiting plate disposed on the inner wall of the removable handle.

4. The electric weeder of claim 3, wherein the limiting structure comprises a limiting block mounted around an end of the sleeve and protruding from a body of the sleeve.

5. The electric weeder of claim 4, wherein the electric weeder further comprises a circle of limiting plate disposed on the inner wall of the removable handle, and the limiting plate is limited by the limiting block to move along with the removable handle without disengaging from an outer wall of the sleeve.

6. The electric weeder of claim 5, further comprising a reset element, wherein the reset element is mounted around the sleeve and held by the first end of the removable handle and the limiting block.

7. The electric weeder of claim 3, wherein the limiting structure comprises a flange disposed on an end of the sleeve and protruding from a body of the sleeve.

8. The electric weeder of claim 7, further comprising a reset element, wherein the reset element is mounted around the transmission shaft and held by the limiting plate and a shoulder disposed on the transmission shaft.

9. The electric weeder of claim 1, wherein the working head includes a plurality of rods arranged on the same circumference.

10. The electric weeder of claim 9, wherein the diameter of the circumference along which the rods are arranged is greater than or equal to about 8 mm but less than or equal to about 20 mm.

11. The electric weeder of claim 10, wherein the ratio of the diameter of the circumference along which the rods are arranged to the diameter of the second end of the removable handle is approximately 0.5 to 1.

12. The electric weeder of claim 11, wherein the removing plate is configured as disc-shaped and provided with a protruding flange on the outer wall, and the other end of the removable handle is circumferentially provided with a groove for accommodating the removing plate and the protruding flange.

13. The electric weeder of claim 1, wherein the overall length of the electric weeder is greater than about 125 mm but less than about 400 mm.

14. The electric weeder of claim 1, wherein the effective working length of the working head is greater than about 20 mm but less than about 50 mm.

15. The electric weeder of claim 1, wherein the diameter of the other end of the removable handle is greater than or equal to about 12 mm but less than or equal to about 30 mm.

16. An electric weeder, comprising:
a housing;
a driving device disposed in the housing, and including an transmission shaft;
a working head, connected to the transmission shaft and driven by the driving device; and
a removable handle disposed around the transmission shaft, wherein a first end of the removable handle is slidably connected to the housing and a second end includes a removing plate being passed through by the working head, the removing plate being configured to rotate axially as the removable handle remains axially fixed.

17. The electric weeder of claim 16, further comprising a sleeve, disposed at an end close to the working head of the housing.

18. The electric weeder of claim 17, further comprising a reset element, disposed between the sleeve and the removable handle for resetting the removable handle automatically.

19. The electric weeder of claim 16, further comprising a reset element, disposed between the transmission shaft and the removable handle for resetting the removable handle automatically.

* * * * *